United States Patent Office 3,167,563
Patented Jan. 26, 1965

3,167,563
O-(RING-SUBSTITUTED) BENZYL ETHERS OF ACYL-PYRIDINEOXIME 1-OXIDES
Edward L. Schumann, Portage Township, Kalamazoo County, Mich., assignor to The Upjohn Company, Kalamazoo, Mich., a corporation of Delaware
No Drawing. Filed Mar. 5, 1962, Ser. No. 177,227
8 Claims. (Cl. 260—296)

This invention pertains to novel chemical compounds, novel pharmaceutical formulations containing the same, and a novel process. More particularly, the invention is directed to O-(ring-substituted)benzyl ethers of acylpyridineoxime 1-oxides, oral and parenteral pharmaceutical formulations containing the same, and to a process for controlling neuromuscular and neurotic reactions in mammals.

The novel O-(ring-substituted)benzyl ethers of acylpyridineoxime 1-oxides of the invention comprise compounds represented by the following structural formula:

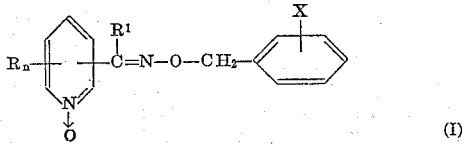

(I)

wherein R is alkyl of from 1 to 6 carbon atoms, inclusive, for example, methyl, ethyl, propyl, butyl, amyl, hexyl, and isomeric forms thereof; $n$ is an integer from zero to 3, inclusive; $R_1$ is selected from the group consisting of the hydrogen atom, alkyl of from 1 to 6 carbon atoms as above, phenyl, and alkylphenyl of from 7 to 9 carbon atoms, inclusive, for example, tolyl, xylyl, and mesityl; and X is selected from the group consisting of halogen, i.e., chlorine, bromine, iodine, and fluorine, and alkoxy of from 1 to 6 carbon atoms, inclusive, for example, methoxy, ethoxy, propoxy, butoxy, amyloxy, hexyloxy, and isomeric forms thereof; and acid addition salts thereof. The acid addition salts include the salts of compounds of the above structural formula with acids such as hydrochloric acid, hydrobromic acid, nitric acid, phosphoric acid, sulfuric acid, methanesulfonic acid, p-toluenesulfonic acid, and like pharmacologically acceptable acids.

An object of this invention is to provide new and useful chemical compounds. Another object of the invention is to provide compounds represented by Formula I, above. Still another object of the invention is to provide O-(ring-substituted)benzyl ethers of acylpyridineoxime 1-oxides, including their acid addition salts, which are safe and effective pharmacologics. A further object of the invention is to provide pharmaceutical formulations containing, as the essential active ingredient, compounds of Formula I, above, including their acid addition salts. A still further object of the invention is to provide a process for controlling neuromuscular, neurotic, psychotic, and psychoneurotic conditions in mammals. Other objects of the invention will be apparent to those skilled in the art.

These and other objects of the invention are accomplished since it has now been found that the compounds of this invention possess unexpected and valuable pharmacologic activities. The compounds are active and useful as anti-inflammatory agents, analgetics, anticonvulsants, muscle relaxants, tranquilizers, antipyretic agents, and drug potentiators (e.g., potentiation of barbitrurate-induced sleep in mammals).

The novel compounds of the invention having Formula I, above, are prepared by reacting an O-(ring-substituted)-benzyl ether of acylpyridineoximes represented by the structural formula:

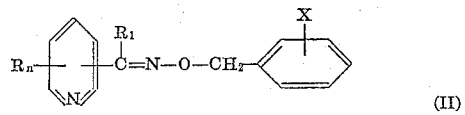

(II)

wherein R, $n$, $R_1$, and X are as defined above, with a peroxidizing agent, for example, hydrogen peroxide (preferred), benzoyl peroxide, and the like. The reaction, advantageously, is carried out in an inert solvent, illustratively, acetic acid, propionic acid, butyric acid, and the like, at temperatures ranging between about 50° C. and about 90° C. The O-(ring-substituted)benzyl ethers of acylpyridineoxime 1-oxides thus obtained are separated from the reaction mixture and recovered in pure form by conventional procedures such as filtration, solvent evaporation, solvent extraction, vacuum distillation, and recrystallization. Generally speaking, these 1-oxides are crystalline solids. They readily form salts with acids and the salts can be prepared in a convenient manner by neutralization of the 1-oxide with an equivalent of the desired acid, or if desired, by metathesis.

The O-(ring-substituted)benzyl ethers of acylpyridineoximes (compounds of Formula II, above) which are used as the starting compounds for preparing the 1-oxides of this invention can be prepared by known general methods. For example, the O-(ring-substituted)benzyl ethers of Formula II wherein $R_1$ is hydrogen can be prepared in accordance with procedures described in U.S. Patent 2,924,604.

The O-(ring-substituted)benzyl ethers of pyridyl ketoximes having Formula II, above, wherein $R_1$ is alkyl, phenyl, or alkylphenyl, can be prepared by etherification of pyridyl ketoximes of the structural formula:

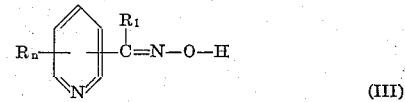

(III)

wherein R and $n$ are as defined above and $R_1$ is alkyl, phenyl, or alkylphenyl. General methods for the preparation of pyridyl ketoximes of Formula III are known, and the particular preparation of certain pyridyl ketoximes has been reported previously. Engler et al. (Ber. 24, 2528, 1891) described the preparation of 2-pyridyl methyl ketoxime by reaction of 2-pyridyl methyl ketone with hydroxylamine hydrochloride in an aqueous sodium hydroxide medium. Engler et al. (Ber. 22, 598, 1889) prepared 3-pyridyl methyl ketoxime by an analogous procedure. Similarly, Pinner (Ber. 34, 4251, 1901) prepared 4-pyridyl methyl ketoxime from 4-pyridyl methyl ketone. Using the methods cited above or other conventional methods for the preparation of oximes, other pyridyl ketoximes of Formula III can be prepared from the corresponding ketones. For example, 2-pyridyl ethyl ketone, 6-methyl-2-pyridyl methyl ketone, 2-pyridyl n-propyl ketone, 5-ethyl-2-pyridyl methyl ketone, 5-methyl-2-pyridyl methyl ketone, 4,6-dimethyl-2-pyridyl methyl ketone, 2-pyridyl isopropyl ketone, 2-pyridyl tert. butyl ketone, 2-pyridyl n-hexyl ketone, 2-pyridyl n-butyl ketone, 2-pyridyl sec. butyl ketone, 2-pyridyl isobutyl ketone, 2-pyridyl 1-methylbutyl ketone, 5-ethyl-2-pyridyl n-propyl ketone, 4,5- diethyl-2-pyridyl n-propyl ketone, 4-ethyl-2-pyridyl methyl ketone, 5-n-butyl-2-pyridyl ethyl ketone, 6-ethyl-2-pyridyl methyl ketone, 5-n-butyl-2-pyridyl n-propyl ketone, 5-methyl-2-pyridyl n-propyl ketone, 3-pyridyl ethyl ketone, 6-methyl-3-pyridyl methyl ketone, 4-methyl-3-pyridyl methyl ketone, 3-pyridyl n-propyl ketone, 6-ethyl-3-pyridyl ethyl ketone, 6-n-propyl-3-pyridyl n-propyl ketone, 2-isobutyl-5-isopropyl-3-pyridyl methyl ketone, 2-methyl-3-pyridyl methyl ketone, 2,6-dimethyl-3-pyridyl methyl ketone, 2,4,6-trimethyl-3-pyridyl methyl ketone, 2,5-dimethyl-6-ethyl-3-pyridyl methyl ketone, 6-n-amyl-3-pyridyl n-amyl ketone, 3-pyridyl n-hexyl ketone, 6-methyl-3-pyridyl n-propyl ketone, 4-n-propyl-3-pyridyl n-propyl ketone, 2,4-dimethyl-3-pyridyl methyl ketone, 3-pyridyl n-butyl ketone, 6-methyl-3-pyridyl ethyl ketone, 6-methyl-3-pyridyl n-butyl ketone, 6-methyl-3-pyridyl n-amyl ketone, 5-ethyl-3-pyridyl methyl ketone, 4-pyridyl n-propyl ketone, 4-pyridyl n-butyl ketone, 5-ethyl-2-methyl-4-pyridyl methyl ketone, 2-methyl-4-pyridyl n-propyl ketone, 2-methyl-4-pyridyl n-butyl ketone, 4-pyridyl ethyl ketone, 2-pyridyl phenyl ketone, 4-methyl-2-pyridyl phenyl ketone, 2-pyridyl o-tolyl ketone, 3-pyridyl phenyl ketone, 2-methyl-3-pyridyl phenyl ketone, 3-pyridyl m-tolyl ketone, 3-pyridyl p-tolyl ketone, 3-pyridyl mesityl ketone, 4-pyridyl phenyl ketone, and 2,6-dimethyl-4-pyridyl phenyl ketone, can be converted to the corresponding pyridyl ketoximes in this manner.

The etherification of the pyridyl ketoximes can be effected by reaction, in the presence of a base, of a compound according to Formula III with a compound of the structural formula:

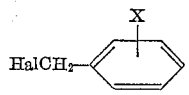

(IV)

wherein X is as hereinbefore defined and Hal represents a halogen atom, e.g., chlorine, bromine, or iodine. Generally speaking, the preferred base employed in the etherification is sodium methoxide. Bases such as sodium ethoxide and like alkoxides, sodium hydroxide, potassium carbonate, etc., can also be employed. The reaction is preferably carried out in a solvent in which the reactants, but not necessarily the base, are soluble. Methanol is the preferred solvent but solvents such as acetone, ethanol, 2-butanone, propanol, and higher alkanols can also be employed. The reaction is advantageously carried out at elevated temperature and preferably under conditions of reflux. The desired product can be isolated from the reaction mixture in a convenient manner by addition of water followed by solvent extraction of the mixture.

O-(ring-substituted)benzyl ethers of acylpyridineoximes (Formula II above) can also be readily prepared by reacting an acrylpyridine of the formula:

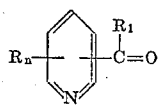

(V)

wherein R, $n$, and $R_1$ are as defined above, with an O-(ring-substituted)benzylhydroxylamine having the formula:

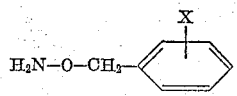

(VI)

wherein X is as defined above. This is a preferred method for preparing the O-alkoxybenzyl ethers of this invention, i.e., compounds of Formula II in which X is alkoxy. The O-(ring-substituted)benzylhydroxylamines of Formula VI are readily prepared according to the procedures described by Mamalis et al., J. Chem. Soc. 1960, 229; Theilacker et al., Angew, Chem. 68, 303, 1956, or by other conventional procedures.

The compounds of Formula I of this invention can also be prepared by reacting an acylpyridine 1-oxide of the formula:

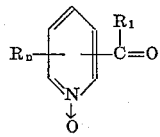

(VII)

wherein R, $n$, and $R_1$ are as defined above, with an O-(ring-substituted)benzylhydroxylamine of Formula VI, to give the corresponding O-(ring-substituted)benzyl ether of acylpyridineoxime 1-oxide.

When used in therapy, the novel O-(ring-substituted)-benzyl ethers of acylpyridineoxime 1-oxides in the form of the free base or in the form of acid addition salts with pharmacologically acceptable acids, can be formulated in novel unit dosage compositions for administration via oral or parenteral routes.

As employed herein, "unit dosage" means that quantity or amount of a composition which is physically separable and contains a readily determinable quantity of active ingredient. The proportion of active ingredient in a unit dosage is determined by (a) the individual characteristics of the active ingredient and the carrier and (b) the therapeutic effect desired. Representative unit dosages are, e.g., a tablet, a capsule, a pill, a powder packet, a wafer, a cachet, a teaspoonful, a tablespoonful, a drop, a cubic centimeter, and segregated multiples thereof.

Unit dosage compositions for oral administration can be formulated with a pharmaceutical carrier in solid or liquid forms. Suitable solid forms include tablets, pills, capsules, granules, powders, wafers, and cachets. Advantageously, the pharmaceutical carrier for such solid forms includes, e. g., cornstarch, lactose, dicalcium phosphate, terra alba (calcium sulfate), talc, stearic acid, magnesium stearate, gums, and functionally similar materials. The tablets or pills can be laminated or otherwise compounded to provide unit dosages affording the advantage of prolonged or delayed action or of predetermined sequential release of the medication. For example, the tablet or pill can be compounded with concentric laminae. The laminae are separated by enteric coating, for example, one which resists disintegration in the stomach, or otherwise permits the inner laminae to pass intact through the stomach into the duodenum for release there or further in the intestines. A variety of substances can be used for such enteric layers or coatings; representative ones include a number of polymeric acids or mixtures of polymeric acids with such materials as shellac, shellac and cetyl alcohol, cellulose acetate phthalate, and the like. A particularly advantageous enteric coating comprises a styrene-maleic acid copolymer.

Suitable liquid forms include solutions, suspensions, and emulsions. Advantageously, the pharmaceutical carrier for such liquid forms comprises water, oils, and oil-water emulsions, and the like. If desired, suitable dispersing or suspending agents can be included, for example, tragacanth, acacia, alginates, dextran, sodium carboxymethylcellulose, methylcellulose, polyvinyl-pyrrolidone, gelatin, and mixtures thereof. Oils suitable for solutions and oil-water emulsions include cottonseed oil, sesame oil, cocoanut oil, and peanut oil. Liquid compositions can contain from about 1% to about 50%, weight by volume, of the active ingredient.

For parenteral administration the O-(ring-substituted)-benzyl ethers of acylpyridineoxime 1-oxides and their acid addition salts can be formulated in dilute sterile aqueous solutions, aqueous suspensions, and oil solutions or suspensions, for intramucular or intraperitoneal injections, or like routes.

The dosage of O-(ring-substituted)benzyl ether of acylpyridineoxime 1-oxide depends upon the route of administration, and the circumstances of treatment (e.g., severity of the condition to be treated and the duration of treatment), as well as the patient's age, weight, and general physical condition. In general, a total daily dosage of from about 1 to about 50 mg./kg. of body weight is effective. Single daily, divided daily, or intermittent schedules can be employed.

For example, the novel compounds of Formula I of this invention can be administered to adults in single doses of from about 25 to about 500 mg. given 1 to 4 times daily to a total daily dose of from about 25 to about 2000 mg. Single oral doses of 5 ml. (1 teaspoonful) containing from about 1% to about 20% active ingredient are preferred for liquid preparations.

Where a combination of pharmacologic effects is desired, compositions containing, in addition to the aforesaid principal active ingredients, one or more of the following secondary active ingredients can be employed advantageously: additional tranquilizers such as reserpine, chlorpromazine, meprobamate, and ectylurea; psychic energizers such as methylphenidate hydrochloride and α-ethyltryptamine acetate; sedatives such as glutethimide, petrichloral, chloral hydrate, and methyprylon; hypotensive agents such as phenoxybenzamine hydrochloride; analgesics such as aspirin, phenacetin, salicylamide, N-acetyl-p-aminophenol, and codeine; antispasmodics such as methscopolamine bromide and propantheline bromide; anticonvulsants such as diphenylhydantoin, paramethadione, phenylacetylurea, and phensuxamide; anti-arthritic agents such as prednisolone, methylprednisolone, and 6α-fluoroprednisolone; and muscle relaxants such as chlorzoxazone, carisoprodol, and phenaglycodol. The amounts of the foregoing secondary active ingredients to be incorporated in the present compositions should not exceed the amounts comprising individual doses of the said secondary active ingredients where they are employed singly.

The O-(ring-substituted)benzyl ethers of 4-acylpyridineoxime 1-oxides of this invention are of particular interest, because they protect mammals, e.g., mice, rats, cats, guinea pigs, and rabbits from convulsions and death due to thiosemicarbazide (TSC) toxicity. In this respect, the new compounds are substantially equivalent in action to other known compounds in protecting mammals from toxicity and the pyridoxal (vitamin $B_6$) depletion caused by TSC. Furthermore, these compounds of the invention are useful for investigating the biochemical mechanism of thiosemicarbazide toxicity and the biochemical functions of vitamin $B_6$.

The following examples are illustrative of the process and products of the present invention, but are not to be construed as limiting.

EXAMPLE 1

*Preparation of O-p-methoxybenzyl ether of 4-pyridinealdoxime 1-oxide*

*Part A.—O-p-methoxybenzylhydroxylamine hydrochloride.*—A solution of 5.7 g. (0.25 mole) of sodium in 300 g. (2.2 moles) of p-methoxybenzyl alcohol (warmed to complete solution) was mixed with stirring at a temperature of about 25° C. with a solution of 0.25 mole of chloramine in 300 ml. of anhydrous ether (prepared according to Inorganic Syntheses, I, p. 59, 1939). After continued stirring of the reaction mixture at about 25° C. for an additional 1.5 hrs., the mixture was poured into 3.5 l. of anhydrous ether and filtered. The filtrate was treated with a solution of hydrogen chloride in anhydrous ether and the crude product separated as a purple solid which decomposed at 210° C. The solid was recrystallized from methanol-anhydrous ether to give 28.7 g. (61% yield) of O-p-methoxybenzylhydroxylamine hydrochloride as white flakes which decomposed at 216° C.

*Analysis.*—Calc'd for $C_8H_{11}NO_2 \cdot HCl$: C, 50.66; H, 6.38; N, 7.39; Cl, 18.70. Found: C, 50.70; H, 6.14; N, 7.65; Cl, 18.82.

*Part B.—O-p-methoxybenzyl ether of 4-pyridinealdoxime 1-oxide.*—A solution of 7.5 g. (0.04 mole) of O-p-methoxybenzylhydroxylamine hydrochloride in 200 ml. of 50% aqueous methanol was mixed with 4.9 g. (0.04 mole) of 4-pyridinealdehyde 1-oxide and 3.5 g. (0.043 mole) of sodium acetate. The reaction mixture was stirred at about 25° C. for 4 hrs., and then refrigerated at about 5° C. for 16 hrs. The product, O-p-methoxybenzyl ether of 4-pyridinealdoxime 1-oxide, separated as white needles and was recoverd by filtration. The crystals weighed 7.0 g. (69% yield) and had a melting point of 136° to 138° C.

*Analysis.*—Calc'd for $C_{14}H_{14}N_2O_3$: C, 65.10; H, 5.46; N, 10.85. Found: C, 64.94; H, 5.40; N, 10.52.

EXAMPLE 2

*Preparation of O-p-chlorobenzyl ether of 4-pyridinealdoxime 1-oxide*

A mixture consisting of 10.0 g. (0.04 mole) of O-p-chlorobenzyl ether of 4-pyridinealdoxime, 40 ml. of glacial acetic acid, and 6.4 ml. of 30% hydrogen peroxide was heated with stirring at 70° C. for about 16 hrs. The volatile components were evaporated under reduced pressure. The residue was mixed with 40 ml. of water and the mixture was evaporated under reduced pressure. Recrystallization of the residue from ethyl acetate yielded 7.5 g. (72% yield) of the O-p-chlorobenzyl ether of 4-pyridinealdoxime 1-oxide as light yellow crystals having a melting point of 153° to 154° C.

*Analysis.*—Calc'd for $C_{13}H_{11}ClN_2O_2$: C, 59.43; H, 4.22; N, 10.67. Found: C, 59.75; H, 4.34; N, 10.65.

EXAMPLE 3

*Preparation of O-p-chlorobenzyl ether of 6-methyl-2-pyridinealdoxime 1-oxide and the hydrochloride thereof*

A solution of 15.0 g. (0.06 mole) of O-p-chlorobenzyl ether of 6-methyl-2-pyridinealdoxime in 60 ml. of glacial acetic acid and 9.0 ml. of 30% hydrogen peroxide was heated with stirring at about 70° C. for about 16 hrs. The volatile components were evaporated under reduced pressure. The residue was mixed with water and the mixture was evaporated under reduced pressure. After recrystallizing the residue from a mixture of ethyl acetate and Skellysolve B (Skellysolve B is essentially a mixture of isomeric hexanes having a boiling range of 140° to 160° F.), a second recrystallization from ethyl acetate gave 2.6 g. of crude product as yellow prisms having a melting point of 79° to 81° C. After a third recrystallization from ethyl acetate during which the solution was refrigerated at −20° C., there was obtained 1.7 g. of O-p-chlorobenzyl ether of 6-methyl-2-pyridinealdoxime 1-oxide as yellow prisms having a melting point of 94° to 95° C.

*Analysis.*—Calc'd for $C_{14}H_{13}ClN_2O_2$: C, 60.76; H, 4.73; N, 10.13; Cl, 12.81. Found: C, 60.71; H, 4.58; N, 9.88; Cl, 12.75.

The hydrochloride is prepared by dissolving the O-p-chlorobenzyl ether of 6-methyl-2-pyridinealdoxime 1-oxide in ether and adding ethereal hydrogen chloride. The hydrochloride of O-p-chlorobenzyl ether of 6-methyl-2-pyridinealdoxime 1-oxide separates and is recovered by removing the ether and excess hydrogen chloride. It may be purified by recrystallization if desired.

EXAMPLE 4

*Preparation of O-p-chlorobenzyl ether of 4-pyridyl methyl ketoxime 1-oxide*

*Part A.—O-p-chlorobenzyl ether of 4-pyridyl methyl ketoxime.*—A solution of 19.4 g. (0.1 mole) of O-p-chlorobenzylhydroxylamine hydrochloride (prepared according to the method described by Mamalis et al., supra) and 12.1 g. (0.1 mole) of 4-pyridyl methyl ketone in 200 ml. of pyridine was heated at reflux for 2 hrs. The volatile components were evaporated on a steam bath under reduced pressure, and the residue thus obtained was mixed with 200 ml. of 10% aqueous sodium hydroxide solution. The solution was extracted with three 200-ml. portions of chloroform and the extracts were combined, washed with water, and the chloroform removed by evaporation. After two recrystallizations of the residue thus obtained from Skellysolve B, there was obtained 16.5 g. of O-p-chlorobenzyl ether of 4-pyridyl methyl ketoxime as white prisms having a melting point of 74° to 75° C.

Analysis.—Calc'd for $C_{14}H_{13}ClN_2O$: C, 64.49; H, 5.02; Cl, 13.60; N, 10.75. Found: C, 64.57; H, 4.99; Cl, 13.61; N, 10.91.

Part B.—O-p-chlorobenzyl ether of 4-pyridyl methyl ketoxime 1-oxide.—A solution of 11 g. (0.042 mole) of O-p-chlorobenzyl ether of 4-pyridyl methyl ketoxime in 130 ml. of glacial acetic acid was mixed with 7 ml. of 30% hydrogen peroxide. After heating and stirring the reaction mixture at 70° C. for about 16 hrs., the volatile components were removed on a steam bath under reduced pressure. The residue thus obtained was mixed with 75 ml. of water, and the water was removed on a steam bath under reduced pressure. The semi-solid residue thus obtained was triturated with hot Skellysolve B, the Skellysolve B was removed, and the O-p-chlorobenzyl ether of 4-pyridyl methyl ketoxime 1-oxide was recrystallized from methyl ethyl ketone. It had a melting point of 126° to 127° C.

Analysis.—Calc'd for $C_{14}H_{13}ClN_2O_2$: C, 60.76; H, 4.73; Cl, 12.81; N, 10.13. Found: C, 60.70; H, 4.87; Cl, 13.09; N, 10.01.

EXAMPLE 5

*Preparation of O-p-methoxybenzyl ether of 5-ethyl-2-methyl-4-pyridinealdoxime 1-oxide*

Following the procedure of Example 1, Part B, but substituting 5-ethyl-2-methyl - 4-pyridinealdehyde 1-oxide for 4-pyridinealdehyde 1-oxide, there was prepared O-p-methoxybenzyl ether of 5-ethyl-2-methyl-4-pyridinealdoxime 1-oxide.

EXAMPLE 6

*Preparation of O-p-methoxybenzyl ether of 3-pyridinealdoxime 1-oxide*

Following the procedure of Example 1, Part B, but substituting 3-pyridinealdehyde 1-oxide for 4-pyridinealdehyde 1-oxide, there was prepared O-p-methoxybenzyl ether of 3-pyridinealdoxime 1-oxide.

EXAMPLE 7

*Preparation of O-p-methoxybenzyl ether of 3-ethyl-4-pyridinealdoxime 1-oxide*

Following the procedure of Example 1, Part B, but substituting 3-ethyl-4-pyridinealdehyde 1-oxide for 4-pyridinealdehyde 1-oxide, there was prepared O-p-methoxybenzyl ether of 3-ethyl-4-pyridinealdoxime 1-oxide.

EXAMPLE 8

*Preparation of O-p-methoxybenzyl ether of 6-n-hexyl-2-pyridinealdoxime 1-oxide*

Following the procedure of Example 1, Part B, but substituting 6-n-hexyl-2-pyridinealdehyde 1-oxide for 4-pyridinealdehyde 1-oxide, there was prepared O-p-methoxybenzyl ether of 6-n - hexyl - 2 - pyridinealdoxime 1-oxide.

EXAMPLE 9

*Preparation of O-m-chlorobenzyl ether of 6-methyl-2-pyridinealdoxime 1-oxide*

Following the procedure of Example 3, but substituting O-m-chlorobenzyl ether of 6-methyl-2-pyridinealdoxime for O-p-chlorobenzyl ether of 6-methyl-2-pyridinealdoxime, there was prepared O-m-chlorobenzyl ether of 6-methyl-2-pyridinealdoxime 1-oxide.

EXAMPLE 10

*Preparation of O-o-chlorobenzyl ether of 6-methyl-2-pyridinealdoxime 1-oxide*

Following the procedure of Example 3, but substituting O-o-chlorobenzyl ether of 6-methyl-2-pyridinealdoxime for O-p-chlorobenzyl ether of 6-methyl-2-pyridinealdoxime, there was prepared O-o-chlorobenzyl ether of 6-methyl-2-pyridinealdoxime 1-oxide.

EXAMPLE 11

*Preparation of O-p-iodobenzyl ether of 4-pyridinealdoxime 1-oxide*

Following the procedure of Example 2, but substituting O-p-iodobenzyl ether of 4-pyridinealdoxime for O-p-chlorobenzyl ether of 4-pyridinealdoxime, there was prepared O-p-iodobenzyl ether of 4-pyridinealdoxime 1-oxide.

EXAMPLE 12

*Preparation of O-o-n-hexyloxybenzyl ether of 4-pyridinealdoxime 1-oxide*

Part A.—O-o-n-hexyloxybenzylhydroxylamine hydrochloride.—Following the procedure of Example 1, Part A, but substituting o-n-hexyloxybenzyl alcohol (Smith et al., J. Econ. Entomol. 42, 439, 1949) for p-methoxybenzyl alcohol, there was prepared O-o-n-hexyloxybenzylhydroxylamine hydrochloride.

Part B.—O-o-n-hexyloxybenzyl ether of 4-pyridinealdoxime 1-oxide.—Following the procedure of Example 1, Part B, but substituting O-o-n-hexyloxybenzylhydroxylamine hydrochloride for O-p-methoxybenzylhydroxylamine hydrochloride, there was prepared O-o-n-hexyloxybenzyl ether of 4-pyridinealdoxime 1-oxide.

EXAMPLE 13

*Preparation of O-p-isopropoxybenzyl ether of 4-pyridinealdoxime 1-oxide*

Part A.—O-p-isopropoxybenzylhydroxylamine hydrochloride.—Following the procedure of Example 1, Part A, but substituting p-isopropoxybenzyl alcohol (Tadros et al., J. Chem. Soc. 1954, 2351) for p-methoxybenzyl alcohol, there was prepared O-p-isopropoxybenzylhydroxylamine hydrochloride.

Part B.—O-p-isopropoxybenzyl ether of 4-pyridinealdoxime 1-oxide.—Following the procedure of Example 1, Part B, but substituting O-p-isopropoxybenzylhydroxylamine hydrochloride for O-p-methoxybenzylhydroxylamine hydrochloride, there was prepared O-p-isopropoxybenzyl ether of 4-pyridinealdoxime 1-oxide.

EXAMPLE 14

*Preparation of O-p-chlorobenzyl ether of 4-pyridyl phenyl ketoxime 1-oxide*

Part A.—O-p-chlorobenzyl ether of 4-pyridyl phenyl ketoxime.—Following the procedure of Example 4, Part A, but substituting 4-pyridyl phenyl ketone for 4-pyridyl methyl ketone, there was prepared O-p-chlorobenzyl ether of 4-pyridyl phenyl ketoxime.

Part B.—O-p-chlorobenzyl ether of 4-pyridyl phenyl ketoxime 1-oxide.—Following the procedure of Example 4, Part B, but substituting O-p-chlorobenzyl ether of 4-pyridyl phenyl ketoxime for O-p-chlorobenzyl ether of 4-pyridyl methyl ketoxime, there was prepared O-p-chlorobenzyl ether of 4-pyridyl phenyl ketoxime 1-oxide.

EXAMPLE 15

*Preparation of O-p-chlorobenzyl ether of 6-ethyl-2-pyridyl methyl ketoxime 1-oxide*

Part A.—O-p-chlorobenzyl ether of 6-ethyl-2-pyridyl methyl ketoxime.—Following the procedure of Example 4, Part A, but substituting 6-ethyl-2-pyridyl methyl ketone for 4-pyridyl methyl ketone, there was prepared O-p-chlorobenzyl ether of 6-ethyl-2-pyridyl methyl ketoxime.

Part B.—O-p-chlorobenzyl ether of 6-ethyl-2-pyridyl methyl ketoxime 1-oxide.—Following the procedure of Example 4, Part B, but substituting O-p-chlorobenzyl ether of 6-ethyl-2-pyridyl methyl ketoxime for O-p-chlorobenzyl ether of 4-pyridyl methyl ketoxime, there was prepared O-p-chlorobenzyl ether of 6-ethyl-2-pyridyl methyl ketoxime 1-oxide.

EXAMPLE 16

*Preparation of O-p-chlorobenzyl ether of 5-n-butyl-2-pyridyl ethyl ketoxime 1-oxide*

*Part A.—O-p-chlorobenzyl ether of 5-n-butyl-2-pyridyl ethyl ketoxime.*—Following the procedure of Example 4, Part A, but substituting 5-n-butyl-2-pyridyl ethyl ketone for 4-pyridyl methyl ketone, there was prepared O-p-chlorobenzyl ether of 5-n-butyl-2-pyridyl ethyl ketoxime.

*Part B.—O-p-chlorobenzyl ether of 5-n-butyl-2-pyridyl ethyl ketoxime 1-oxide.*—Following the procedure of Example 4, Part B, but substituting O-p-chlorobenzyl ether of 5-n-butyl-2-pyridyl ethyl ketoxime for O-p-chlorobenzyl ether of 4-pyridyl methyl ketoxime, there was prepared O-p-chlorobenzyl ether of 5-n-butyl-2-pyridyl ethyl ketoxime 1-oxide.

EXAMPLE 17

*Preparation of O-p-chlorobenzyl ether of 4,6-dimethyl-2-pyridyl methyl ketoxime 1-oxide*

*Part A.—O-p-chlorobenzyl ether of 4,6-dimethyl-2-pyridyl methyl ketoxime.*—Following the procedure of Example 4, Part A, but substituting 4,6-dimethyl-2-pyridyl methyl ketone for 4-pyridyl methyl ketone, there was prepared O-p-chlorobenzyl ether of 4,6-dimethyl-2-pyridyl methyl ketoxime.

*Part B.—O-p-chlorobenzyl ether of 4,6-dimethyl-2-pyridyl methyl ketoxime 1-oxide.*—Following the procedure of Example 4, Part B, but substituting O-p-chlorobenzyl ether of 4,6-dimethyl-2-pyridyl methyl ketoxime for O-p-chlorobenzyl ether of 4-pyridyl methyl ketoxime, there was prepared O-p-chlorobenzyl ether of 4,6-dimethyl-2-pyridyl methyl ketoxime 1-oxide.

EXAMPLE 18

*Preparation of O-p-chlorobenzyl ether of 4-pyridyl n-butyl ketoxime 1-oxide*

*Part A.—O-p-chlorobenzyl ether of 4-pyridyl n-butyl ketoxime.*—Following the procedure of Example 4, Part A, but substituting 4-pyridyl n-butyl ketone for 4-pyridyl methyl ketone, there was prepared O-p-chlorobenzyl ether of 4-pyridyl n-butyl ketoxime.

*Part B.—O-p-chlorobenzyl ether of 4-pyridyl n-butyl ketoxime 1-oxide.*—Following the procedure of Example 4, Part B, but substituting O-p-chlorobenzyl ether of 4-pyridyl n-butyl ketoxime for O-p-chlorobenzyl ether of 4-pyridyl methyl ketoxime, there was prepared O-p-chlorobenzyl ether of 4-pyridyl n-butyl ketoxime 1-oxide.

EXAMPLE 19

*Preparation of O-p-chlorobenzyl ether of 3-pyridyl p-tolyl ketoxime 1-oxide*

*Part A.—O-p-chlorobenzyl ether of 3-pyridyl p-tolyl ketoxime.*—Following the procedure of Example 4, Part A, but substituting 3-pyridyl p-tolyl ketone for 4-pyridyl methyl ketone, there was prepared O-p-chlorobenzyl ether of 3-pyridyl p-tolyl ketoxime.

*Part B.—O-p-chlorobenzyl ether of 3-pyridyl p-tolyl ketoxime 1-oxide.*—Following the procedure of Example 4, Part B, but substituting O-p-chlorobenzyl ether of 3-pyridyl p-tolyl ketoxime for O-p-chlorobenzyl ether of 4-pyridyl methyl ketoxime, there was prepared O-p-chlorobenzyl ether of 3-pyridyl p-tolyl ketoxime 1-oxide.

EXAMPLE 20

*Preparation of O-p-chlorobenzyl ether of 3-pyridyl n-hexyl ketoxime 1-oxide*

*Part A.—O-p-chlorobenzyl ether of 3-pyridyl n-hexyl ketoxime.*—Following the procedure of Example 4, Part A, but substituting 3-pyridyl n-hexyl ketone for 4 pyridyl methyl ketone, there was prepared O-p-chlorobenzyl ether of 3-pyridyl n-hexyl ketoxime.

*Part B.—O-p-chlorobenzyl ether of 3-pyridyl n-hexyl ketoxime 1-oxide.*—Following the procedure of Example 4, Part B, but substituting O-p-chlorobenzyl ether of 3-pyridyl n-hexyl ketoxime for O-p-chlorobenzyl ether of 4-pyridyl methyl ketoxime, there was prepared O-p-chlorobenzyl ether of 3-pyridyl n-hexyl ketoxime 1-oxide.

EXAMPLE 21

*Preparation of O-p-chlorobenzyl ether of 2,4,6-trimethyl-3-pyridyl methyl ketoxime 1-oxide*

*Part A.—O-p-chlorobenzyl ether of 2,4,6-trimethyl-3-pyridyl methyl ketoxime.*—Following the procedure of Example 4, Part A, but substituting 2,4,6-trimethyl-3-pyridyl methyl ketone for 4-pyridyl methyl ketone, there was prepared O-p-chlorobenzyl ether of 2,4,6-trimethyl-3-pyridyl methyl ketoxime.

*Part B.—O-p-chlorobenzyl ether of 2,4,6-trimethyl-3-pyridyl methyl ketoxime 1-oxide.*—Following the procedure of Example 4, Part B, but substituting O-p-chlorobenzyl ether of 2,4,6-trimethyl-3-pyridyl methyl ketoxime for O-p-chlorobenzyl ether of 4-pyridyl methyl ketoxime, there was prepared O-p-chlorobenzyl ether of 2,4,6-trimethyl-3-pyridyl methyl ketoxime 1-oxide.

EXAMPLE 22

*Preparation of O-p-chlorobenzyl ether of 2-isobutyl-5-isopropyl-3-pyridyl methyl ketoxime 1-oxide*

*Part A.—O-p-chlorobenzyl ether of 2-isobutyl-5-isopropyl-3-pyridyl methyl ketoxime.*—Following the procedure of Example 4, Part A, but substituting 2-isobutyl-5-isopropyl-3-pyridyl methyl ketone for 4-pyridyl methyl ketone, there was prepared O-p-chlorobenzyl ether of 2-isobutyl-5-isopropyl-3-pyridyl methyl ketoxime.

*Part B.—O-p-chlorobenzyl ether of 2-isobutyl-5-isopropyl-3-pyridyl methyl ketoxime 1-oxide.*—Following the procedure of Example 4, Part B, but substituting O-p-chlorobenzyl ether of 2-isobutyl-5-isopropyl-3 - pyridyl methyl ketoxime for O-p-chlorobenzyl ether of 4-pyridyl methyl ketoxime, there was prepared O-p-chlorobenzyl ether of 2-isobutyl-5-isopropyl-3-pyridyl methyl ketoxime 1-oxide.

EXAMPLE 23

*Preparation of O-p-chlorobenzyl ether of 2-pyridyl isopropyl ketoxime 1-oxide*

*Part A.—O-p-chlorobenzyl ether of 2-pyridyl isopropyl ketoxime.*—Following the procedure of Example 4, Part A, but substituting 2-pyridyl isopropyl ketone for 4-pyridyl methyl ketone, there was prepared O-p-chlorobenzyl ether of 2-pyridyl isopropyl ketoxime.

*Part B.—O-p-chlorobenzyl ether of 2-pyridyl isopropyl ketoxime 1-oxide.*—Following the procedure of Example 4, Part B, but substituting O-p-chlorobenzyl ether of 2-pyridyl isopropyl ketoxime for O-p-chlorobenzyl ether of 4-pyridyl methyl ketoxime, there was prepared O-p-chlorobenzyl ether of 2-pyridyl isopropyl ketoxime 1-oxide.

EXAMPLE 24

*Preparation of O-p-chlorobenzyl ether of 3-pyridyl mesityl ketoxime 1-oxide*

*Part A.—O-p-chlorobenzyl ether of 3-pyridyl mesityl ketoxime.*—Following the procedure of Example 4, Part A, but substituting 3-pyridyl mesityl ketone for 4-pyridyl methyl ketone, there was prepared O-p-chlorobenzyl ether of 3-pyridyl mesityl ketoxime.

*Part B.—O-p-chlorobenzyl ether of 3-pyridyl mesityl ketoxime 1-oxide.*—Following the procedure of Example 4, Part B, but substituting O-p-chlorobenzyl ether of 3-pyridyl mesityl ketoxime for O-p-chlorobenzyl ether of 4-pyridyl methyl ketoxime, there was prepared O-p-chlorobenzyl ether of 3-pyridyl mesityl ketoxime 1-oxide.

EXAMPLE 25

*O-p-bromobenzyl ether of 4-pyridinealdoxime 1-oxide*

Following the procedure of Example 2, but substituting O-p-bromobenzyl ether of 4-pyridinealdoxime for O-p-chlorobenzyl ether of 4-pyridinealdoxime, there was prepared O-p-bromobenzyl ether of 4-pyridinealdoxime 1-oxide.

EXAMPLE 26

Ten thousand (10,000) scored tablets for oral use, each containing 200 mg. of O-p-chlorobenzyl ether of 4-pyridinealdoxime 1-oxide, are prepared from the following ingredients:

|  | G. |
|---|---|
| O-p-chlorobenzyl ether of 4-pyridinealdoxime 1-oxide | 2000 |
| Starch U.S.P. | 170 |
| Talc U.S.P. | 130 |
| Lactose U.S.P. | 2600 |
| Sucrose powder U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets.

EXAMPLE 27

Ten thousand (10,000) two-piece hard gelatin capsules for oral use, each containing 100 mg. of O-p-chlorobenzyl ether of 4-pyridinealdoxime 1-oxide, are prepared from the following ingredients:

|  | G. |
|---|---|
| O-p-chlorobenzyl ether of 4-pyridinealdoxime 1-oxide | 1000 |
| Lactose U.S.P. | 750 |
| Starch U.S.P. | 300 |
| Talc U.S.P. | 65 |
| Calcium stearate | 25 |

One to two capsules are administered every 4 hours for controlling epilepsy and psychomotor seizures.

EXAMPLE 28

One-piece soft elastic capsules for oral use, each containing 25 mg. of O-p-chlorobenzyl ether of 4-pyridinealdoxime 1-oxide, are prepared in the usual manner by first dispersing the powdered active material in sufficient corn oil to render the material capsulatable.

One to two capsules are administered 4 times daily to relieve pain and stiffness in muscles and joints.

EXAMPLE 29

An aqueous preparation for oral use containing 350 mg. of O-p-chlorobenzyl ether of 4-pyridinealdoxime 1-oxide in each 5 ml. is prepared from the following ingredients:

| O-p-chlorobenzyl ether of 4-pyridinealdoxime 1-oxide | g | 700 |
|---|---|---|
| Methylparaben U.S.P. | g | 7.5 |
| Propylparaben U.S.P. | g | 2.5 |
| Saccharin sodium | g | 12.5 |
| Cyclamate sodium | g | 2.5 |
| Glycerin | ml | 3000 |
| Tragacanth powder | g | 10 |
| Orange oil flavor | g | 10 |
| F. D. and C. orange dye | g | 7.5 |
| Deionized water q.s. to 10,000 ml. | | |

One teaspoonful is administered 3 times daily to control emotional disturbances such as anxiety, tension, tension headache, agitated depression, and acute agitation.

EXAMPLE 30

A sterile aqueous solution suitable for intramuscular or intravenous use and containing 250 mg. of O-p-chlorobenzyl ether of 4-pyridinealdoxime 1-oxide in each ml. is prepared from the following ingredients:

|  | G. |
|---|---|
| O-p-chlorobenzyl ether of 4-pyridinealdoxime 1-oxide | 250 |
| Chlorobutanol | 3 |
| Water for injection q.s. to 1000 ml. | |

One to two ml. is injected for the relief of pain and the acute phase of skeletal muscle spasm.

EXAMPLE 31

Ten thousand (10,000) two-piece hard gelatin capsules for oral use, each containing 50 mg. of O-p-chlorobenzyl ether of 4-pyridinealdoxime 1-oxide and 65 mg. of ethoxazolamide, are prepared from the following ingredients:

|  | G. |
|---|---|
| O-p-chlorobenzyl ether of 4-pyridinealdoxime 1-oxide | 500 |
| Ethoxazolamide | 650 |
| Corn starch U.S.P. | 500 |
| Magnesium stearate | 25 |
| Talc U.S.P. | 65 |

One to two capsules are administered 3 times daily for the relief of premenstrual tension.

EXAMPLE 32

Ten thousand (10,000) tablets for oral use, each containing 75 mg. of O-p-chlorobenzyl ether of 4-pyridinealdoxime 1-oxide, 1 mg. of methylprednisolone, and 300 mg of asprin, are prepared from the following ingredients:

|  | G. |
|---|---|
| O-p-chlorobenzyl ether of 4-pyridinealdoxime 1-oxide | 750 |
| Methylprednisolone | 10 |
| Aspirin | 3000 |
| Starch | 750 |
| Magnesium stearate | 25 |
| Talc | 50 |

The ingredients are mixed carefully and slugged. The slugs are broken into granules which are compressed into tablets of the correct weight.

The tablets so prepared are useful in the treatment of moderate cases of rheumatoid arthritis by the administration of 1 to 2 tablets 3 to 4 times daily.

I claim:

1. A compound selected from the group consisting of compounds of the formula

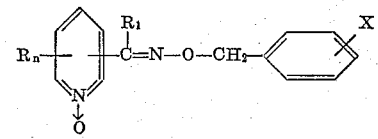

wherein R is alkyl of from 1 to 6 carbon atoms, inclusive; $n$ is an integer from zero to 3, inclusive; $R_1$ is selected from the group consisting of the hydrogen atom, alkyl of from 1 to 6 carbon atoms, inclusive, phenyl, and alkylphenyl of from 7 to 9 carbon atoms, inclusive; and X is selected from the group consisting of halogen and alkoxy of from 1 to 6 carbon atoms, inclusive, and pharmacologically acceptable acid addition salts thereof.

2. O-halobenzyl ether of pyridinealdoxime 1-oxide according to claim 1.

3. O-p-chlorobenzyl ether of 4-pyridinealdoxime 1-oxide.

4. O-p-chlorobenzyl ether of 6-methyl-2-pyridinealdoxime 1-oxide.

5. O-alkoxybenzyl ether of pyridinealdoxime 1-oxide according to claim 1.

6. O-p-methoxybenzyl ether of 4-pyridinealdoxime 1-oxide.

7. O-halobenzyl ether of pyridyl ketoxime 1-oxide according to claim 1.

8. O-p-chlorobenzyl ether of 4-pyridyl methyl ketoxime 1-oxide.

References Cited by the Examiner

UNITED STATES PATENTS

| | | |
|---|---|---|
| 2,500,131 | 3/50 | Linsker. |
| 2,518,130 | 8/50 | Evans et al. |
| 2,816,113 | 12/57 | Wilson et al. _____ 260—296 |
| 2,924,603 | 2/60 | Gordon et al. |
| 2,924,604 | 2/60 | Steinhards et al. _____ 260—296 |
| 2,976,291 | 3/61 | Jacob et al. |
| 3,060,177 | 10/62 | Druey et al. _____ 260—296 |

OTHER REFERENCES

Culvenor: Rev. of Pure and Applied Chem. vol. 3, No. 2, pp. 85–86 (1953).

IRVING MARCUS, *Primary Examiner.*

D. T. McCUTCHEN, *Examiner.*

UNITED STATES PATENT OFFICE
CERTIFICATE OF CORRECTION

Patent No. 3,167,563            January 26, 1965

Edward L. Schumann

It is hereby certified that error appears in the above numbered patent requiring correction and that the said Letters Patent should read as corrected below.

Column 1, lines 21 to 26, the left-hand portion of the formula should appear as shown below instead of as in the patent:

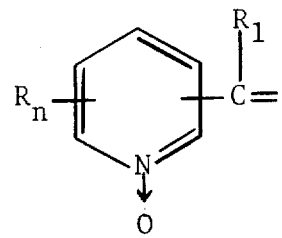

column 2, lines 5 to 9 and lines 39 to 42, and column 3, lines 55 to 59, the benzene rings, each occurrence, should appear as shown below instead of as in the patent:

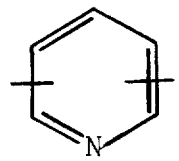

column 2, line 58, for "ketones" read -- pyridyl --; column 12, lines 64 to 68, the first benzene ring should appear as shown below instead of as in the patent:

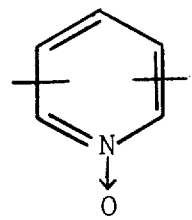

Signed and sealed this 15th day of June 1965.

(SEAL)
Attest:

ERNEST W. SWIDER
Attesting Officer

EDWARD J. BRENNER
Commissioner of Patents